(12) United States Patent
Breiner et al.

(10) Patent No.: US 8,448,741 B2
(45) Date of Patent: May 28, 2013

(54) ELECTRO-HYDRAULIC STEERING FEEDBACK AND ADJUSTMENT

(75) Inventors: Scott J Breiner, Dubuque, IA (US); Mark J Cherney, Potosi, WI (US)

(73) Assignee: Deere & Company, Moline, IL (US)

( * ) Notice: Subject to any disclaimer, the term of this patent is extended or adjusted under 35 U.S.C. 154(b) by 1787 days.

(21) Appl. No.: 11/505,571

(22) Filed: Aug. 16, 2006

(65) Prior Publication Data

US 2008/0041655 A1 Feb. 21, 2008

(51) Int. Cl.
*B62D 13/00* (2006.01)

(52) U.S. Cl.
USPC .......................... 180/418; 180/422

(58) Field of Classification Search
USPC .................. 180/418, 422
See application file for complete search history.

(56) References Cited

U.S. PATENT DOCUMENTS

| | | |
|---|---|---|
| 3,664,129 A | 5/1972 | Schwab |
| 4,771,846 A | 9/1988 | Venable et al. |
| 4,834,205 A * | 5/1989 | Mizuno et al. ................. 180/422 |
| 5,181,173 A | 1/1993 | Avitan |
| 5,272,932 A | 12/1993 | Koyamatsu et al. |
| 5,398,505 A | 3/1995 | Oogushi et al. |
| 5,423,391 A | 6/1995 | Shimizu |
| 5,823,876 A | 10/1998 | Unbehand |
| 5,868,573 A | 2/1999 | Kerby et al. |
| 6,000,490 A | 12/1999 | Easton |
| 6,283,859 B1 | 9/2001 | Carlson et al. |
| 6,373,465 B2 | 4/2002 | Jolly et al. |
| 6,389,343 B1 | 5/2002 | Hefner et al. |
| 6,631,773 B1 | 10/2003 | Walker |
| 7,143,863 B2 * | 12/2006 | Dillon ........................... 180/418 |
| 7,434,653 B2 * | 10/2008 | Khalil et al. .................. 180/418 |
| 2002/0103589 A1 * | 8/2002 | Millsap et al. ................... 701/42 |
| 2004/0084259 A1 * | 5/2004 | Carlson ......................... 188/164 |
| 2004/0093139 A1 * | 5/2004 | Wildey et al. .................. 701/41 |
| 2005/0092540 A1 * | 5/2005 | Saarinen et al. .............. 180/418 |
| 2005/0139412 A1 * | 6/2005 | Vigholm ....................... 180/418 |
| 2006/0162988 A1 * | 7/2006 | Ivantysynova et al. ....... 180/418 |

FOREIGN PATENT DOCUMENTS

DE 4238998 5/1994

* cited by examiner

*Primary Examiner* — Paul N Dickson
*Assistant Examiner* — Maurice Williams
(74) *Attorney, Agent, or Firm* — Faegre Baker Daniels LLP

(57) ABSTRACT

A vehicle is disclosed having a hydraulic system. The hydraulic system includes a steering input and a feedback to the steering input. In another aspect of the disclosure, an adjustable gain is provided between steering inputs to the system and the steering output from the system.

15 Claims, 4 Drawing Sheets

ELECTRO-HYDRAULIC STEERING FEEDBACK AND ADJUSTMENT

BACKGROUND OF THE INVENTION

The present invention relates generally to hydraulic control systems. More particularly, the present invention relates to a hydraulic control system that operates a hydraulic actuator in response to a steering input, such as a steering wheel.

BACKGROUND AND SUMMARY

Many pieces of construction equipment use hydraulics to control the functions performed by the equipment. For example, many pieces of construction equipment use hydraulics to control the steering of the vehicle. For an operator to have a sense of the response of the vehicle to steering instructions, it is helpful for the steering wheel or other such steering device to provide feedback to the operator.

According to an aspect of the present invention, a vehicle is provided including an articulated frame having a front portion and a back portion, a plurality of traction devices configured to propel the frame on the ground, at least one hydraulic actuator coupled to the front and back portions of the frame to control the relative positions of the front and back portions of the frame, and a control system coupled to the at least one hydraulic actuator. The control system includes a steering wheel, a controller, a steering wheel sensor positioned to detect the position of the steering wheel and communicate the position of the steering wheel to the controller, a hydraulic fluid control positioned to provide hydraulic fluid to the at least one hydraulic actuator and receive communication from the controller to adjust the position of the hydraulic actuator in response to a change in position of the steering wheel, a vehicle condition sensor positioned to detect a condition of the vehicle and communicate the condition to the controller, and a resistance control device coupled to the steering wheel and in communication with the controller to adjust the resistance to movement of the steering wheel in response to the condition sensed by the vehicle condition sensor.

According to another aspect of the present invention, a vehicle used by an operator is provided. The vehicle includes an articulated frame having a front portion and a back portion, a plurality of traction devices configured to propel the frame on the ground, at least one hydraulic actuator coupled to the front and back portions of the frame to control the relative positions of the front and back portions of the frame, and a control system coupled to the at least one hydraulic actuator. The control system includes an operator steering input, a controller, a steering input sensor positioned to detect the movement of the steering input and provide a signal indicative of the movement of the steering input to the controller, a hydraulic fluid control positioned to provide hydraulic fluid to the at least one hydraulic actuator and receive communication from the controller to adjust the position of the hydraulic actuator in response to a change in position of the steering input, a vehicle condition sensor positioned to detect a condition of the vehicle and communicate the condition to the controller, and a steering feedback coupled to the operator steering input and in communication with the controller to provide physical feedback to the operator through the operator steering input in response to the condition sensed by the vehicle condition sensor.

According to another aspect of the present invention, a vehicle is provided including an articulated frame having a front portion and a back portion, a plurality of traction devices configured to propel the frame on the ground, at least one hydraulic actuator coupled to the front and back portions of the frame to control the relative positions of the front and back portions, and a control system coupled to the at least one hydraulic actuator. The control system includes a steering wheel, a controller, a steering wheel sensor positioned to detect the position of the steering wheel and communicate an output of the position of the steering wheel to the controller, and a hydraulic fluid control positioned to provide hydraulic fluid to the at least one hydraulic actuator and receive an input from the controller to adjust the position of the hydraulic actuator in response to a change in position of the steering wheel. The controller provides a gain between the output of the steering wheel sensor and the input to the hydraulic fluid control. The control system further includes a vehicle condition sensor positioned to detect a condition of the vehicle and communicate the condition to the controller. The controller adjusts the gain in response to a change in the condition.

Additional features of the present invention will become apparent to those skilled in the art upon consideration of the following detailed description of the presently perceived best mode of carrying out the invention.

BRIEF DESCRIPTION OF THE DRAWINGS

The detailed description of the drawings particularly refers to the accompanying figures in which.

DETAILED DESCRIPTION OF THE DRAWINGS

Figure 1:
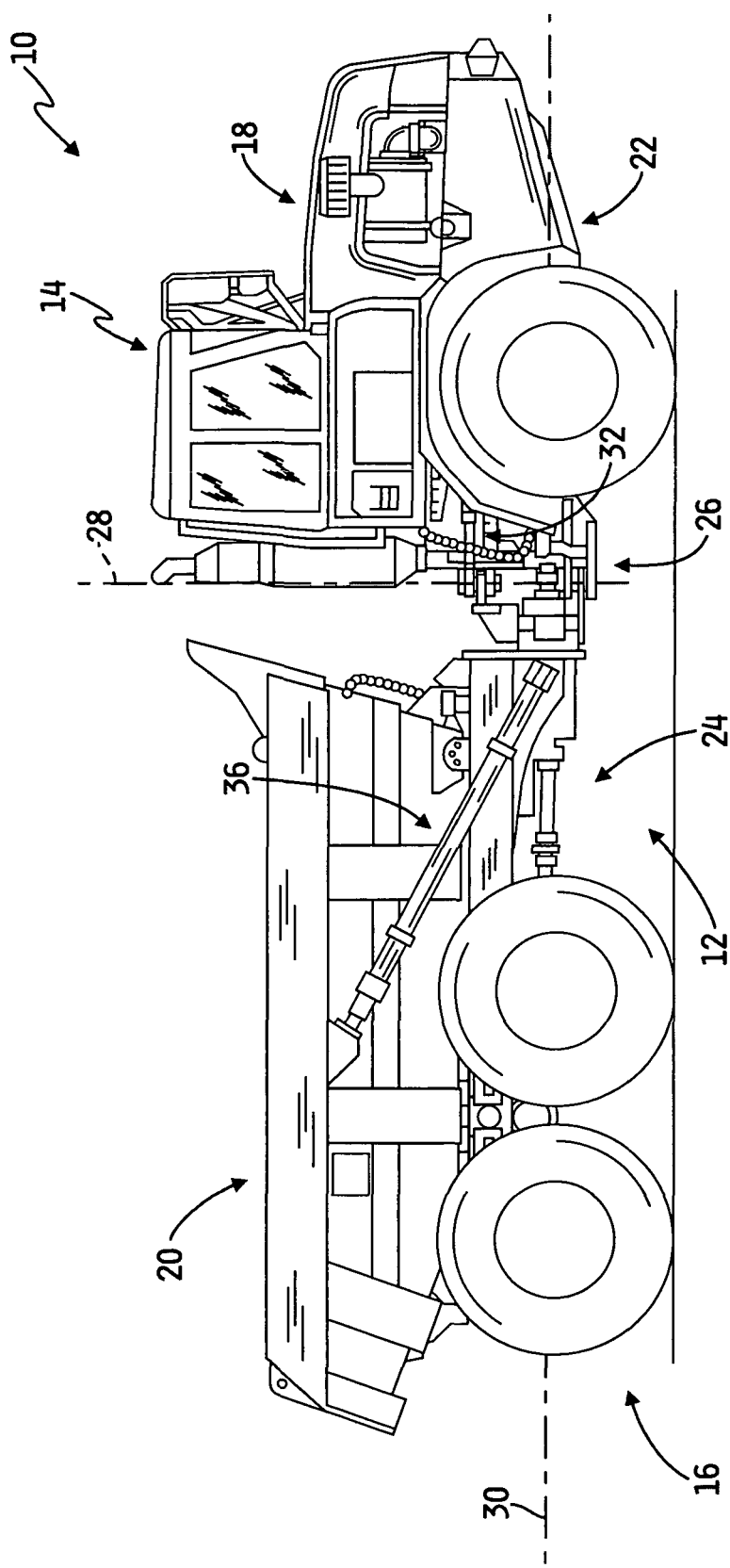
FIG. 1 is a side elevation view of an articulated dump track or ADT showing the ADT including a frame, a cab supported by the frame, a bin supported by the frame, and a plurality of wheels supporting the frame on the ground.

An articulated dump truck or ADT 10 is shown in FIG. 1 for hauling loose materials such as rock, dirt, sand, gravel, coal, and other materials. ADT 10 includes an articulated frame 12, a passenger cab 14 an plurality of traction device or wheels 16 to propel frame 12 and the remainder of ADT 10 along the ground, an engine 18 to power operation of ADT 10, and a bin 20 for holding the material. Frame 12 includes a front portion 22 and a back portion 24 that is pivotably coupled to back portion 24 through an articulation joint 26 shown in FIG. 2. In addition to pivoting about a vertical axis 28 defined by articulation joint 26, back portion 24 can also rotate about a horizontal axis 30 as shown in FIG. 1.

Figure 2:
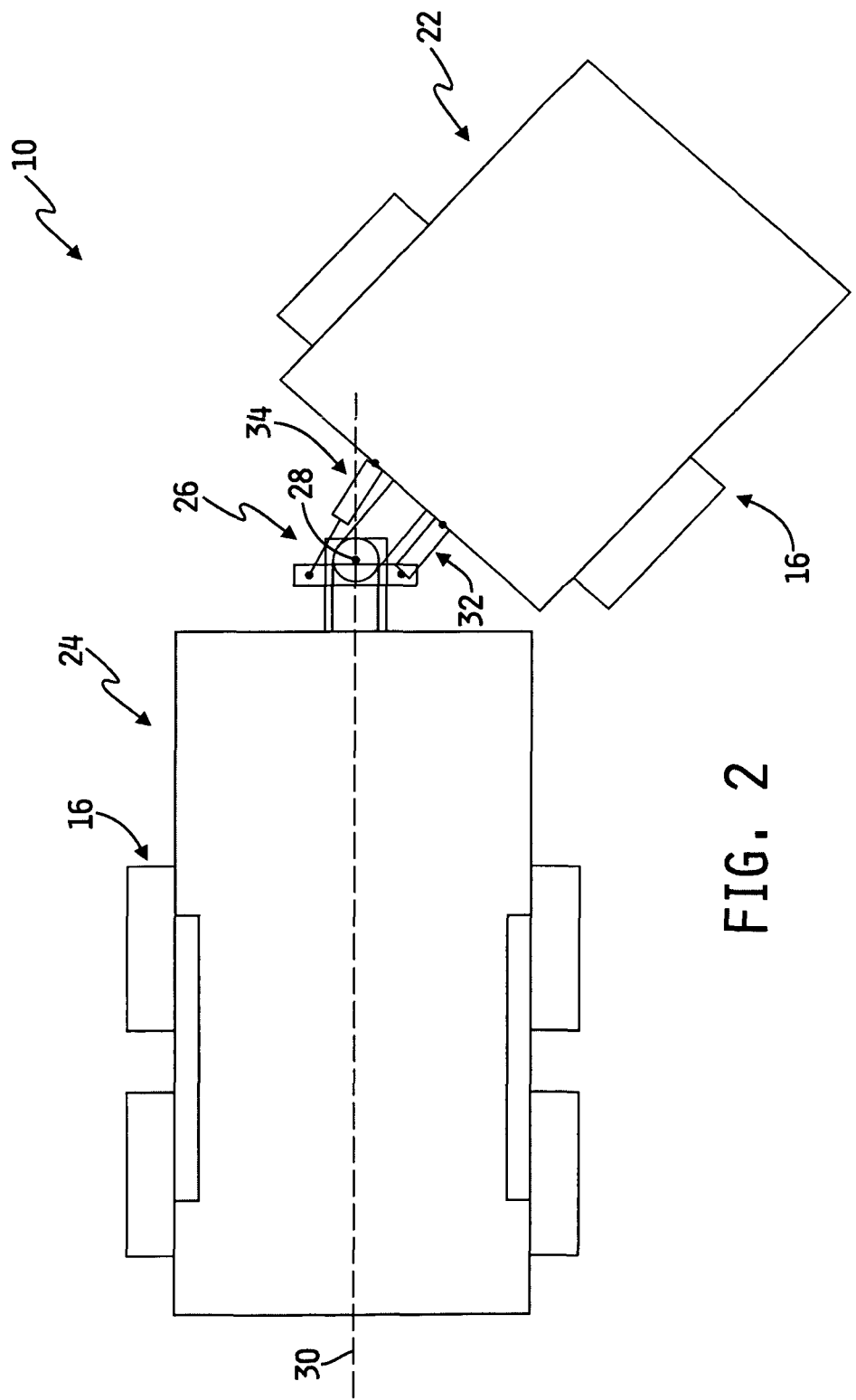
FIG. 2 is a diagrammatic top plan view of the ADT of FIG. 1 showing the frame including a front portion that supports the cab and a back portion that supports the bin and a pair of hydraulic cylinders articulating the front and back portions relative to one another during turning of the ADT.

To steering ADT 10, it includes a pair of hydraulic actuators or articulation cylinders 32, 34 that power pivoting of front portion 22 of frame 12 relative back portion 24 as shown in FIG. 2. ADT 10 also includes other hydraulic actuators to power movement of components such as bin-dump cylinders 36 shown in FIG. 1 that raise and lower bin 20.

Figure 3:
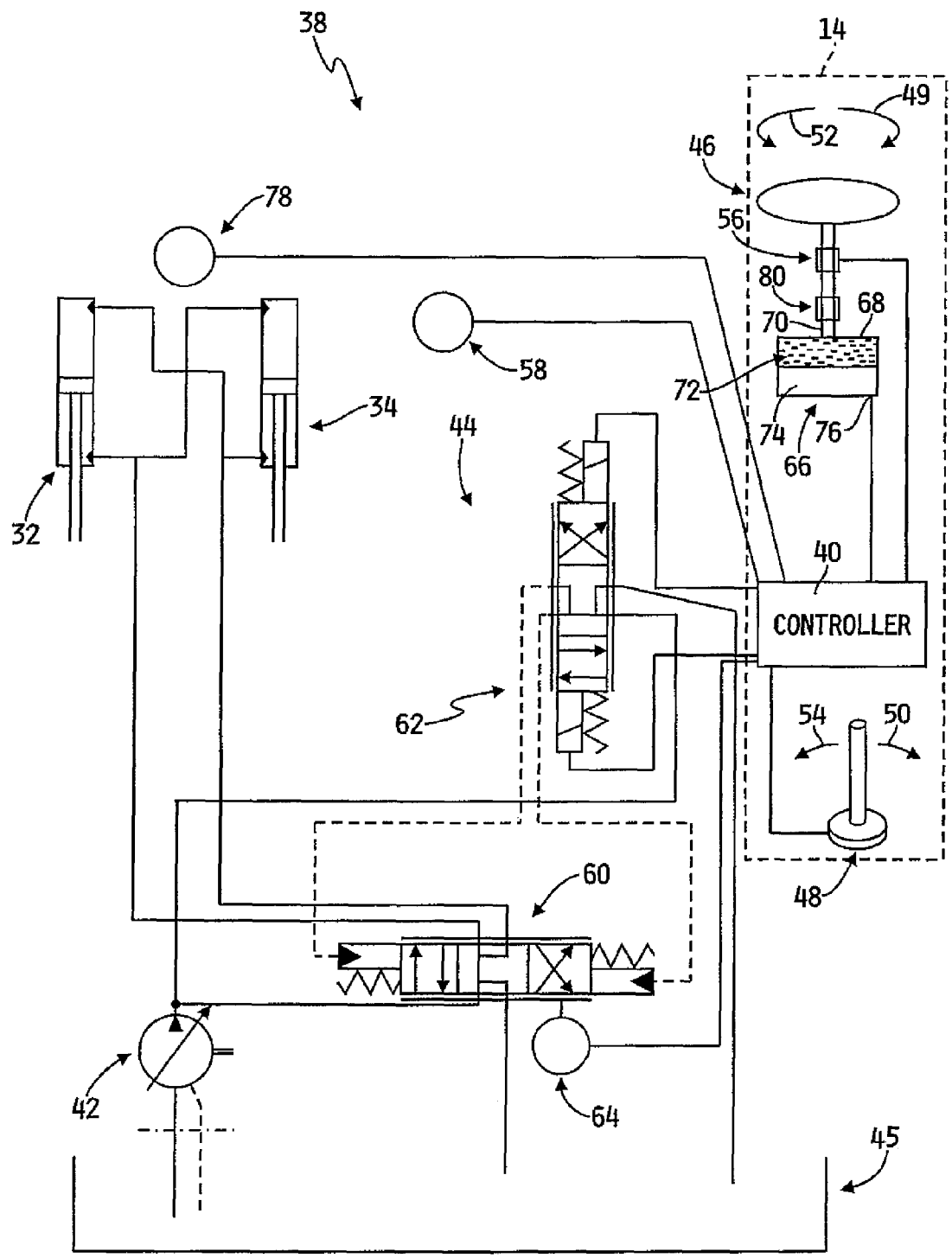
FIG. 3 is a schematic view of a portion of a hydraulic control system of the ADT of FIG. 1.

To power and control the hydraulic actuators, ADT 10 includes a hydraulic control system 38 as shown in FIG. 3. Preferably, control system 38 includes a controller 40 that receives inputs from various sources and provides commands or other outputs to various components of ADT 10 based on logic stored in controller 40 and the received inputs. Hydraulic control system 38 includes a pressure source or hydraulic pump 42 that pressurizes to the hydraulic fluid and a hydraulic fluid tank 45 that receives hydraulic fluid back from the actuators, such as articulation actuators 32, 34. Hydraulic control system 38 also includes a plurality of hydraulic controls 44 (only one shown for hydraulic cylinders 32, 34) that control the flow and pressure of hydraulic fluid provided to the actuators. The hydraulic controls 44 may be grouped together in a bank together outside of cab 14.

Control system 38 includes operator steering inputs that are controlled by an operator of ADT 10 who rides in cab 14. The steering inputs include a steering wheel 46 and a joystick 48 as shown in FIG. 3. To turn ADT 10 to the right, the operator rotates steering wheel 46 in a clockwise direction 49 or moves joystick 48 in a right direction 50. Similarly, to turn ADT 10 to the left, the operator rotates steering wheel 46 in a counterclockwise direction 52 or moves joystick 48 in a left direction 54.

To detect movement of steering wheel 46, control system 38 includes a steering wheel input sensor 56 positioned to detect movement of steering wheel 46 as shown in FIG. 3. Suitable types of sensors for steering input sensor 56 include potentiometers, optical encoders, or other types of suitable sensors known to those of ordinary skill in the art that detect the position of steering wheel 46. Joystick 48 also includes a steering input sensor (not shown) that detects side-to-side and other movement of joystick 48.

Controller 40 receives electric signals from steering sensor 56 for steering wheel 46 and from joystick 48. Based on these signals, controller 40 instructs fluid control 44 to provide articulation cylinders 32, 34 with the appropriate rate and direction of flow to turn ADT 10 right or left. Controller 40 provides gain or a relationship between the number or turns of steering wheel 46 required to turn front and back portions 22, 24 relative to each other. Depending on the operating conditions of ADT 10, this gain may be adjusted by controller 40.

As shown in FIG. 2, front portion 22 of frame 12 is turned or articulated to its right-most extreme or end-of-travel position. Front portion 22 of frame 12 is also capable of turning to a left-most extreme position (not shown). When working at slow speeds, it may be desirable to require fewer turns of steering wheel 46 to turn front portion 22 of frame 12 from one end-of-travel position to the other end-of-travel position. For example, when operating in the relatively tight constraints of a quarry, it may be useful to have controller 40 provide a relatively high gain that results in front portion 22 traveling from one extreme to the other in approximately one turn of steering wheel 46. Under other conditions, it may be useful to have a lower gain. For example, when ADT 10 is on a road, it may be useful for controller 40 to provide a lower gain that results in front portion 22 of frame traveling from one extreme to another in approximately four turns of steering wheel 46. Similarly, the gain provided between joystick 48 and controller hydraulic control 44 can be adjusted. Typically, joystick 48 provides a signal indicative of the direction of tilting and degree of tilt to controller 40. Based on this signal, controller 40 provides a corresponding signal to hydraulic control 44 with a desired gain. Depending on conditions, the gain may be lower (for example, in a quarry) or higher (for example, on the road).

Controller 40 considers vehicle condition inputs to determine the amount of gain to provide between the steering inputs and the output provided to hydraulic control 44. One such input is the speed of ADT 10. As shown in FIG. 3, control system 38 includes a first vehicle condition sensor or speed sensor 58 that is positioned to detect movement of ADT 10. Speed sensor 58 sends a signal to controller 40 indicative of movement of ADT 10, such as speed. Speed sensor 58 may be the speedometer provided on the ADT 10 or may be a separate sensor.

According to one embodiment of the present disclosure, controller 40 inversely adjusts the gain between the steering inputs and the output to fluid control 44 based on the speed of ADT 10. For example, at lower speed, more gain is provided so that fewer turns of steering wheel 46 (or less tilting of joystick 48) results in more turning of front portion of 22 of frame 12. Thus, when ADT 10 is at a stop or moving slowly, such as when in a quarry, as indicated by the signal from speed sensor 58, controller 40 will provide a high gain. When ADT 10 is moving faster, such as on a road, as indicated by the signal from speed sensor 58, controller 40 will provide a low gain. The relationship between the speed of ADT 10 and the gain may be linear or non-linear.

Additionally, other vehicle condition sensors may also provide input to controller 40 to effect the gain provided by controller 40. For example, according to one embodiment, control system 38 may include an operator actuated switch (not shown) that toggles between a predetermined high gain and a predetermined low gain. According to another embodiment, the operator input is infinitely adjustable to allow the operator to select any gain within a predetermined range.

As shown in FIG. 3, hydraulic fluid control 44 includes a proportional hydraulic spool valve 60 and a solenoid or electrically operated pilot valve 62. Controller 40 is coupled to pilot valve 62 and provides an electric signal to pilot valve 62 proportional to the amount of determined gain for the current condition. Pilot valve 62 then provides a hydraulic signal to proportional valve 60 that controls the direction and flow rate of hydraulic fluid provided to first and second cylinders 32, 34.

According to one embodiment, an optional spool position sensor 64 is provided to detect the position of proportional valve 60. Sensor 64 sends a signal to controller 40 indicative of the position of proportional valve 60. Depending on the temperature of the hydraulic fluid, valve 60, and/or the environment, proportional valve 60 may not fully move to the desired position. If controller 40 detects that proportional valve 60 has not reached the desired position, it instructs pilot valve 62 to provide more or less pilot pressure to proportional valve 60 until it reaches the desired position.

Figure 4:
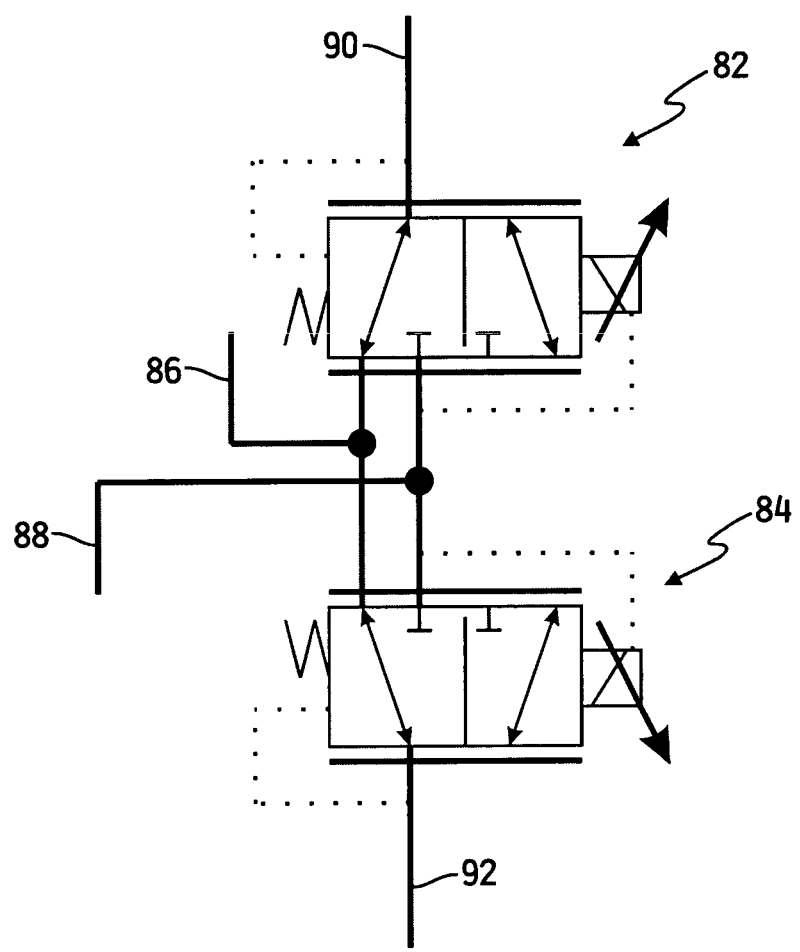
FIG. 4 is a schematic view of an alternative pilot valve arrangement.

According to another embodiment, single pilot valve 62 is replaced with pair of pilot valves 82, 84 (shown in FIG. 4) to control the position of proportional valve 60. Each pilot valve is controlled by controller 40 and coupled to tank 45 through pressure line 86 and to pump 42 through pressure line 88. Pilot valve 82 communicates with one of the pilot ports of proportional valve 60 through pressure line 90. Similarly, pilot valve 84 communicates with one the other pilot port of proportional valve 60 through pressure line 92.

As a result of the hydraulic fluid provided to cylinders 32, 34, they extend and retract in opposite directions to turn front portion 22 of frame 12 right and left. As shown in FIG. 2, each cylinder 32, 34 has an extended end-of-stoke position and a retracted end-of stroke position that is typically reached when front portion 22 of frame 12 reaches its right or left-most extreme position.

To provide feedback to steering wheel 46 indicating that front portion 22 has reached an extreme position, control system 38 includes a steering resistance control device or steering feedback 66 to controls the amount of resistance to turning steering wheel 46. Preferably, steering feedback 66 is a magneto-rheological (MR) or particle clutch that includes a housing 68, an output shaft 70 coupled to steering wheel 46, a magnetically responsive material 72, a magnetic field generator 74, and an input 76 electrically coupled to controller 40. The preferred MR clutch is provided by the Lord Corporation. According to alternative embodiments of the present disclosure, other clutches and resistance control devices are provided such as brakes, a band clutch, block clutch, coil clutch, cone clutch, or any other resistance control device known to those of ordinary skill in the art that controls the resistance to movement between two components.

Controller 40 adjusts the amount of effort required to turn steering wheel 46 through MR clutch 66. By increasing the magnetic field provided by field generator 74, the amount of torque required to turn steering wheel 46 can be adjusted.

Controller 40 uses inputs and internal logic to control the signal sent to MR clutch 66 to adjust the resistance provided to steering wheel 46. Some of the inputs used by controller 40 may include the position of front frame 22 relative to rear frame 24, the speed that steering wheel 46 is being turned by the operator, and the rotational velocity of front portion 22 of frame 12 relative to rear portion 24 of frame 12.

In addition to speed sensor 58, control system 38 includes a sensor 78 that indicates the position of front portion 22 of frame 12 relative to back portion 24 of frame 12. Sensor 78 may be positioned between front and back portions 22, 24 to detect the angular position between front and back portions 22, 24. Because the extension of cylinders 32, 34 controls the angular position of front and back portions 22, 24, such a sensor may also be used to determine the degree of extension of cylinders 32, 34. Sensor 78 may also be positioned to detect the extension of cylinders 32, 34. Because the angular position of front and back portions 22, 24 of frame 12 depends on the extension of cylinders 32, 34, such a sensor may be used to determine the degree of articulation of frame 12.

During operation, controller 40 receives input from steering sensor 56 and articulation sensor 78. Based on these inputs and internal logic, controller 40 instructions clutch 66 to provide a certain level of resistance to turning steering wheel 46. When controller 40 detects that front portion 22 of frame 12 is approaching its end-of-travel position either to the right or left, it ramps up the resistance until steering wheel 46 is substantially or completely locked. This prevents further turning of steering wheel 46 when the end-of travel position is reached and prevents cylinders 32, 34 from reaching the end-of-stroke position too quickly to avoid damage.

If the user attempts to turn steering wheel 46 in the opposite direction, controller 40 relaxes the resistance so the operator can move front portion 22 of frame 12 away from the end-of-travel position. As shown in FIG. 3, a coupler 80 is positioned between steering wheel 46 and feedback device 66 that allows a few degrees of play or dead band. Because of the dead band, steering wheel 46 can reverse direction with little or no resistance. Controller 40 detects this reversal based on a signal from steering wheel sensor 56 and drops the resistance provided by feedback device 66 to allow additional reverse steering of steering wheel 46.

During turning of front portion 22 of frame 12, controller 40 compares the rate of turning of steering wheel 46 using the signal from steering wheel sensor 56 to the rate of turning of front portion 22 of frame 12 using articulation sensor 78. If steering wheel 46 is turned too quickly so that steering wheel 46 gets in front of front portion 22, controller 40 increases the resistance to steering wheel 46 to allow front portion 22 to catch up with steering wheel 46.

Controller 40 may also use steering wheel sensor 56 and articulation sensor 78 to adjust the gain. During initial turning of front portion 22 of frame 12 or a change in direction, controller 40 provides a lower gain and ramps up to a normal gain to avoid rapid changes in fluid pressure provided to cylinders 32, 34. By ramping up the gain, smoother transitions are provided during initial turning and changes in direction. Thus, if steering sensor 56 detects the operator attempting to turn steering wheel 46 in a direction opposite the direction detected by articulation sensor 78, the gain can be lowered, then ramped up by controller 40. The ramp up may be either linear or non-linear.

As shown in FIG. 3, steering wheel 46, steering wheel sensor 56, and clutch 66 are preferably positioned inside of cab 14. Hydraulic control 60 for cylinders 32, 34 is preferably positioned outside of cab 14 with electric lines or cables from controller 40 passing through cab 14. Alternatively, controller 40 may also be positioned outside cab 14 with electrical lines or cables passing through cab 14 to steering wheel sensor 56 and clutch 66.

The control system above has been described in reference to an articulated dump truck. According to other embodiments of the present disclosure, the control system may be provided on other vehicles such as articulated graders, backhoe loaders, articulated scrapers, dozers, articulated loaders, crawler loaders, excavators, skid steers, scrapers, trucks, cranes, or any other type of vehicles known to those of ordinary skill in the art. In addition to wheels, other types of traction devices may be provided on such vehicles such as tracks or other traction devices known to those of ordinary skill in the art.

Although the invention has been described in detail with reference to certain preferred embodiments, variations and modifications exist within the spirit and scope of the invention as described and defined in the following claims.

The invention claimed is:

1. A vehicle including
an articulated frame having a front portion and a back portion,
a plurality of traction devices configured to propel the frame on the ground,
at least one hydraulic actuator coupled to the front and back portions of the frame to control the relative positions of the front and back portions of the frame, and
a control system coupled to the at least one hydraulic actuator and including
a steering wheel,
a controller,
a steering wheel sensor positioned to detect the position of the steering wheel and communicate the position of the steering wheel to the controller,
a hydraulic fluid control positioned to provide hydraulic fluid to the at least one hydraulic actuator and receive communication from the controller to adjust the position of the hydraulic actuator in response to a change in position of the steering wheel,
a vehicle condition sensor positioned to detect a condition of the vehicle and communicate the condition to the controller, and
a resistance control device coupled to the steering wheel and in communication with the controller to adjust the resistance to movement of the steering wheel in response to the condition sensed by the vehicle condition sensor.

2. The vehicle of claim 1, wherein the vehicle condition sensor is positioned to determine the articulation between the front and back portions of the frame.

3. The vehicle of claim 2, wherein the controller adjusts the resistance applied by the resistance control device based on the articulation of the front and back portions of the frame nearing an end-of-travel position.

4. The vehicle of claim 2, wherein the controller adjusts the resistance applied by the resistance control device based on the rate of change of the articulation between the front and back portions of the frame.

5. The vehicle of claim 1, wherein the resistance control device includes a housing, an output shaft coupled to the steering wheel, and an electrical input in communication with the controller.

6. The vehicle of claim 1, wherein the hydraulic fluid control includes a proportional hydraulic valve in fluid communication with the at least one hydraulic actuator and an electrically operated pilot valve in fluid communication with the proportional valve and in electrical communication with the controller.

7. The vehicle of claim 6, wherein the electronically operated pilot valve controls the position of the proportional hydraulic valve based on the a signal received from the controller and the position of the proportional hydraulic valve controls the direction and rate of flow of pressurized hydraulic fluid to the at least one hydraulic actuator.

8. A vehicle used by an operator including
an articulated frame having a front portion and a back portion,
a plurality of traction devices configured to propel the frame on the ground,
at least one hydraulic actuator coupled to the front and back portions of the frame to control the relative positions of the front and back portions of the frame, and
a control system coupled to the at least one hydraulic actuator and including
an operator steering input,
a controller,
a steering input sensor positioned to detect the movement of the steering input and provide a signal indicative of the movement of the steering input to the controller,
a hydraulic fluid control positioned to provide hydraulic fluid to the at least one hydraulic actuator and receive communication from the controller to adjust the position of the hydraulic actuator in response to a change in position of the steering input,
a vehicle condition sensor positioned to detect a condition of the vehicle and communicate the condition to the controller, and
a steering feedback coupled to the operator steering input and in communication with the controller to provide physical feedback to the operator through the operator steering input in response to the condition sensed by the vehicle condition sensor.

9. The vehicle of claim 8, wherein the operator steering input includes a steering wheel, the steering input sensor is positioned to detect movement of the steering wheel, and the physical feedback adjusts the resistance to turning the steering wheel in response to a change in the condition sensed by the vehicle condition sensor.

10. The vehicle of claim 9, wherein the operator steering input further includes a joystick and the control system further includes another steering input sensor positioned to detect the angular position of the joystick and send a signal to the controller indicative of the angular position of the joystick.

11. The vehicle of claim 8, wherein the steering feedback includes a housing, a magnetic field generator, and a magnetically responsive material, the controller controls the magnetic field generated by the magnetic field generator to adjust the level of physical feedback.

12. The vehicle of claim 8, wherein the physical feedback operates to resist movement of the steering input.

13. The vehicle of claim 8, wherein the at least one hydraulic actuator includes an end-of-stroke position and the physical feedback substantially blocks movement of the steering input upon the hydraulic actuator approaching the end-of-stroke position.

14. The vehicle of claim 8, wherein the at least one hydraulic actuator includes first and second hydraulic cylinders operating in opposite directions during articulation of the first and second portions of the frame, each of the first and second cylinders have an end-of-stroke position and the physical feedback substantially blocks movement of the steering input upon either of the first and second portions of the frame approaching the end-of-stroke position.

15. The vehicle of claim 8, wherein the vehicle condition sensor detects the angular position between the first and second portions of the frame and the steering input sensor detects the position of the steering input, the controller compares the rates of change of the position of the angular position and the rate of change of the position of the steering input and adjusts the physical feedback based on the comparison.

* * * * *